April 20, 1954　　　F. S. MALICK　　　2,675,900
ELECTROMAGNETIC CLUTCH OPERATOR
Filed June 10, 1950
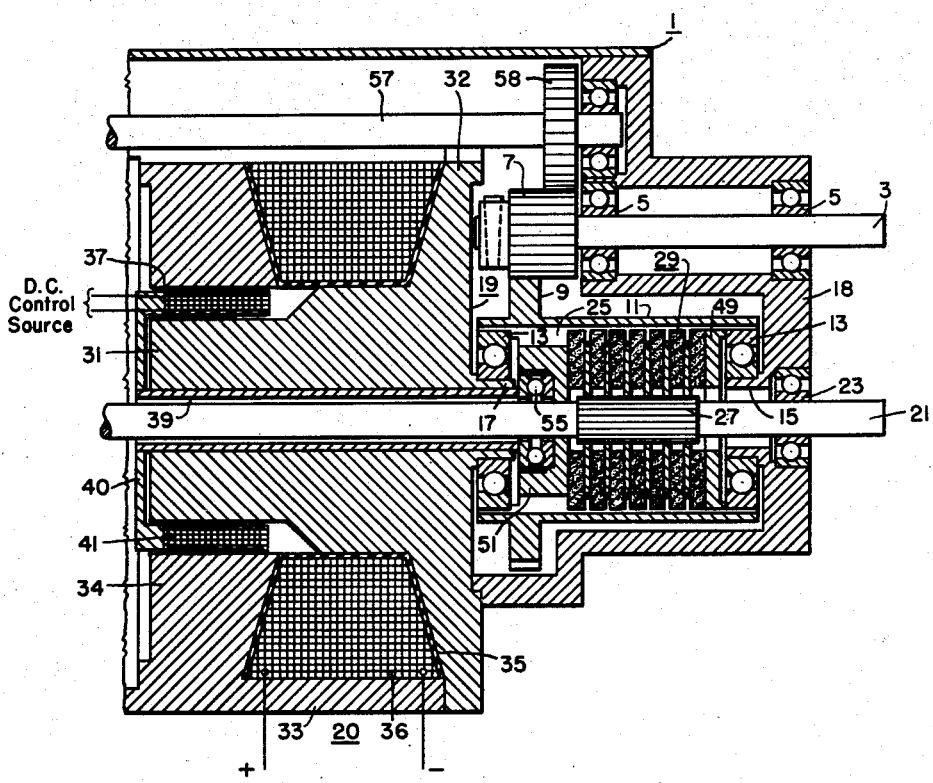
WITNESSES:
Edward Michaels
E. F. Oberheim
INVENTOR
Franklin S. Malick.
BY
Paul E. Friedemann
ATTORNEY Patented Apr. 20, 1954

2,675,900

UNITED STATES PATENT OFFICE 2,675,900

ELECTROMAGNETIC CLUTCH OPERATOR

Franklin S. Malick, Pittsburgh, Pa., assignor, by mesne assignments, to the United States of America as represented by the Secretary of the Navy Application June 10, 1950, Serial No. 167,396

5 Claims. (Cl. 192—84)

1

This invention relates, generally, to power transmitting drives and more in particular to a friction clutch assembly involving a plurality of friction discs for affording a mechanical coupling between the input and the output shaft.

In the application of friction clutches to servomechanism systems, it is highly essential that these clutches be stable in operation. Frequently, in a servomechanism the friction clutch is operated by an electromagnet which is energized in dependence of certain control intelligences applied thereto. In the past it has been customary to employ a flat faced magnet for actuating the friction discs of the clutch. This type of magnet, it will be appreciated, embodies an armature member which actuates the friction discs and which in disengaged position is disposed in predetermined spaced relation with respect to the core structure of the electromagnet. When the electromagnet is energized, the armature is attracted towards the core structure with a force which varies inversely as the square of the length of the airgap. Thus the closer the armature is to the core structure or the smaller the airgap, the higher the force becomes for a constant coil current and it will be appreciated that as the stack of discs wear that the airgap will be diminished. Thus for the assumed constant coil current the output of the clutch will increase. This may create an unstable condition in the servo system requiring repeated recalibration.

Additionally, an arrangement of this type is highly critical so far as adjustment is concerned. This will be appreciated from a consideration of a practical embodiment in which, in order to achieve the necessary force for operating the friction discs, the airgap between the armature and the core structure was of the order of .02 of an inch with the discs disengaged. From this, it will be appreciated that after a short period of use the wear of the friction discs will be sufficient for the armature to engage the core structure, thereby arresting its movement before the friction discs have been moved into proper frictional engagement. Thus, after a relatively short period of time of operation of the clutch in the servo system, clutch failure may occur resulting in disablement of the system.

Accordingly, it is one object of this invention to provide an electromagnetically operated clutch assembly which has a long useful life.

Another object of this invention is to provide an electrodynamically operated clutch assembly in which the magnet force for a given current in the moving coil is essentially constant throughout the useful life of the clutch.

2

A further object of this invention is to provide an electrodynamically operated clutch assembly wherein a relatively long stroke of the movable element of the electrodynamic system is achievable so that the magnetic pull of the electrodynamic system is essentially constant throughout the useful operating range of the movable clutch elements.

It is a specific object of this invention to provide an electrodynamically operated friction clutch assembly embodying a moving coil as the force producing element.

The foregoing statements are merely illustrative of the various aims and objects of this invention. Other objects and advantages will become apparent upon a study of the following disclosure when considered in conjunction with the accompanying drawing in which the single figure thereof is a longitudinal sectional view of a clutch assembly embodying the principles of this invention.

In the drawing, the clutch assembly includes a housing generally designated 1. An input shaft 3 is journaled in bearings 5 disposed in the upper section of the housing 1. Input shaft 3 carries a drive pinion 7 at its extremity inside the housing. This drive pinion 7 meshes with a gear 9 which may be an integral part of or attached to a clutch barrel 11. Bearings 13, which journal the opposite ends of the clutch barrel 11, are mounted upon bearing seats 15 and 17, respectively. Bearing seat 15 is supported by an end plate 18 which closes one end of the clutch housing 1, while bearing seat 17 is supported at one end of the core structure 19 of an electromagnet assembly, generally designated 20. As illustrated, these bearings are disposed in coaxial relation and an output shaft 21 is positioned concentrically of this assembly. The output shaft 21 is journaled in a bearing 23 in one end plate 18 of the housing. The other end of the shaft 21 is similarly journaled at one end of a clutch assembly corresponding exactly to that herein illustrated. Only half of this clutch assembly is illustrated in the interest of simplicity since both of these sections are the same. The clutch barrel 11 is internally splined at 25 while the output shaft 21 is provided with an external spline designated 27. A stack of friction discs 29 is disposed within the clutch barrel about the splined section of the output shaft 21. The splines on the barrel and on the output shaft respectively engage alternate discs of the disc stack to thereby afford a driving connection between the clutch barrel 11 and the output shaft 21 when the discs are biased into engagement one with the other.

The biasing means for the discs includes the electromagnet or electrodynamic motor or force producing member designated 20. The core section, generally designated 19, of this electrodynamic force producing member is comprised of two parts, an inner cylindrical core section 31 having a flange 32 at the end thereof adjacent the disc stack and an outer cylindrical core section 33 having an inwardly directed flange 34. The outer cylindrical core section 33 has an outer diameter corresponding to that of the outer diameter of the flange 32 of the inner core section and these sections are arranged to interfit one with the other to define a magnetic circuit having an annular cavity 35 therein for receiving an annular coil 36. The magnetic circuit also includes a radial airgap 37 which is formed between the inner circular face of the flange 34 and an outer circular portion of the inner core section 31. This radial airgap is concentrically disposed in the illustration with respect to the axis of the output shaft 21. The inner core section 31 is provided with a central opening also concentrically disposed of the axis of shaft 21 through which a tubular member of non-magnetic material designated 39 is slidably mounted. The end of this tubular member adjacent the radial airgap 37 is fitted with a disc 40 of non-magnetic material to the outer periphery of which there is attached one end of an annular coil 41 which, in the position illustrated, is supported in spaced relation between the sides of the radial airgap 37. The mounting of coil 41 is such that movement thereof transversely of the airgap 37 is provided by sliding movement of the sleeve or push rod 39 through the central opening of the inner core section 31. The disc stack 29 is mounted between the thrust plates 49 and 51, respectively, on the right and left hand ends of the disc stack. Thrust plate 49 seats against the outer race of the bearing 13 while the thrust plate 51 is slidably mounted for movement axially of the disc stack on the surfaces of splines 25 at the left end of the clutch barrel 11 in a position between the disc stack and the associated bearing 13. Thrust plate 51 is counterbored to receive a thrust bearing 55 against which the right hand end of the thrust tube 39 bears.

With the arrangement illustrated, it is preferred that the coil 36 be excited with direct current. The number of coil turns and the current density is such that sufficient ampere turns are available to at least substantially saturate the magnetic core structure 19. Thus a magnetic flux is caused to flow across the radial airgap 37 between the sides of which the coil 41 is mounted. Upon excitation of the coil 41 with a control voltage, again preferably direct current, of the proper polarity, it will be appreciated that a magnetic field due to the conducted current in coil 41 will be produced which reacts with the main magnetic field produced by the coil 36 to produce a thrust from right to left of the clutch assembly as viewed to drive the push rod or sleeve 39 solidly against the thrust bearing assembly 55 to thereby apply an axial compression force on the stack of discs 29, which force is linearly related to the current with which the coil 41 is excited. The stiffness of a servomechanism using this type of clutch remains essentially constant throughout the life of the clutch. An important advantage of this invention is the fact that the force can be made constant over a distance constituting the useful life or wear of the discs. This means that the clutch life will be longer and adjustments will be less critical than with the flat faced type of magnet.

If a double clutch assembly is preferred, the second clutch unit may be driven from an idler shaft 57 having a gear 58 at one end thereof meshing with the input gear 7 and having a second similar gear at the other end thereof driving suitable gearing into a clutch barrel corresponding exactly to that herein illustrated. The gearing drive is necessarily such that the clutch barrels are rotated in opposite directions so that, for example, engagement of the disc stack on the right hand side of the clutch will effect rotation of the output shaft in one direction, while engagement of the disc stack on the left hand end of the clutch will cause rotation of the output shaft in a reverse direction. With an assembly of this type, it being recalled that the force is proportional to the current in the moving coil, both clutches can be disengaged at zero torque output and no power is wasted and the disc wear reduced. Since the iron in the magnetic circuit is saturated or at least substantially saturated by the field coil 36, there is very little inductance in the moving coil circuit. This gives a considerable reduction in the time constant of the clutch unit as a servomechanism drive.

The foregoing disclosure and the showings made in the drawing are merely illustrative of the principles of this invention and are not to be interpreted in a limiting sense.

I claim as my invention:

1. In a clutch assembly, the combination of, a pair of relatively movable clutch members subject to wear, an operating member for biasing said clutch members in one direction to cause engagement thereof, means forming a magnetic circuit concentrically disposed of said clutch members and axially spaced therefrom, said means having a pair of spaced concentric circular faces defining a radial airgap therebetween, means for producing a substantially constant magnetic field across said radial airgap, an annular coil, means supporting said annular coil in said radial airgap in spaced relation with the faces thereof for movement transversely of said airgap, means connecting said annular coil with said operating member, and circuit means for applying an electric current of varying magnitudes to said annular coil, said clutch members being engaged with substantially the same force, substantially irrespective of the wear thereof, whenever the same amount of current flows through the annular coil.

2. In a clutch assembly, the combination of, a pair of relatively movable clutch members subject to wear, an operating member for biasing said clutch members in one direction to cause engagement thereof, means forming a magnetic circuit concentrically disposed of said clutch members and axially spaced therefrom, said means having a pair of spaced concentric circular faces defining a radial airgap therebetween, a coil mounted on said means and adapted to produce a substantially constant magnetic field which at least substantially saturates said magnetic circuit and produces a substantially constant magnetic flux across said radial airgap, an annular coil, means supporting said annular coil in said radial airgap in spaced relation with the faces thereof for movement transversely of said airgap, means connecting said annular coil with said operating member, and circuit means for applying an electric current of varying magnitudes to said annular coil, said clutch members being engaged with substantially the same force, substantially irrespective of the wear thereof, whenever the same amount of current flows through the annular coils.

3. In a clutch assembly, the combination of, an internally splined clutch barrel member, an externally splined shaft member, bearing means concentrically supporting both of said members, means for driving one of said members, a plurality of friction discs, subject to wear, alternately splined to said barrel member and said shaft member, an operating member for compressing said plurality of discs, means forming a magnetic circuit coaxially disposed of said shaft member, said means forming a magnetic circuit having a pair of concentric spaced circular faces defining a radial airgap concentrically disposed of said shaft member and having a substantially constant magnetic flux therein bridging said radial airgap, an annular coil, means supporting said annular coil for movement transversely of said airgap, means connecting said annular coil with said operating member, and circuit means for applying an electric current of varying magnitudes to said annular coil, said discs being compressed by substantially the same force, substantially irrespective of the wear thereof, whenever the same amount of current flows through said annular coil.

4. In a clutch assembly, the combination of, an internally splined clutch barrel member, an externally splined shaft member, bearing means concentrically supporting both of said members, means for driving one of said members, a plurality of friction discs, subject to wear, alternately splined to said barrel member and said shaft member, an operating member for compressing said plurality of discs, means forming a magnetic circuit coaxially disposed of said shaft member, said means forming a magnetic circuit having a pair of concentric spaced circular faces defining a radial airgap concentrically disposed of said shaft member, a coil mounted on said means forming a magnetic circuit and adapted to produce a magnetic field which at least substantially saturates said magnetic circuit and produces a substantially constant magnetic flux across said radial airgap, an annular coil, means supporting said annular coil for movement transversely of said airgap, means connecting said annular coil with said operating member, and circuit means for applying an electric current of varying magnitudes to said annular coil, said discs being compressed by substantially the same force, substantially irrespective of the wear thereof whenever the same amount of current flows through said annular coil.

5. In a clutch assembly, the combination of, an internally splined clutch barrel member, an externally splined shaft member, bearing means concentrically supporting both of said members, means for driving one of said members, a plurality of friction discs, subject to wear, alternately splined to said barrel member and said shaft member, an operating member for compressing said plurality of discs, a first cylindrical core section having a flange at one end thereof, means supporting said first core section concentrically of said shaft adjacent said plurality of discs, a second cylindrical core section of a diameter corresponding to the outer diameter of said flange and having an inwardly directed flange, said second core section fitting over said first core section defining an annular coil receiving cavity between said flanges, said inwardly directed flange having a central opening therein having a circumferential face radially spaced from a portion of said first core section forming a radial airgap therebetween, a coil in said coil receiving cavity for producing a substantially constant magnetic flux which at least substantially saturates said magnetic circuit and produces a substantially constant magnetic flux across said radial airgap, an annular coil, means supporting said annular coil in said radial airgap in spaced relation with the faces thereof, for movement transversely of said airgap, means connecting said annular coil with said operating member, and circuit means for applying an electric current of varying magnitudes to said annular coil, said discs being compressed by substantially the same force, substantially irrespective of the wear thereof whenever the same amount of current flows through said annular coil.

References Cited in the file of this patent

UNITED STATES PATENTS

| Number | Name | Date |
|---|---|---|
| 1,746,365 | Schunemann | Feb. 11, 1930 |
| 1,950,057 | Lange | Mar. 6, 1934 |
| 1,960,004 | Franz | May 22, 1934 |
| 2,009,301 | Rode et al. | July 23, 1935 |
| 2,096,763 | Ray et al. | Oct. 26, 1937 |
| 2,187,835 | Martin | Jan. 23, 1940 |
| 2,263,819 | Ray | Nov. 25, 1941 |
| 2,405,642 | Corte | Aug. 13, 1946 |
| 2,503,243 | Cohen | Apr. 11, 1950 |

FOREIGN PATENTS

| Number | Country | Date |
|---|---|---|
| 28,062 | France | Sept. 2, 1924 |
| 596,146 | France | Oct. 16, 1925 |